(12) United States Patent  
Morrison et al.

(10) Patent No.: US 7,619,617 B2  
(45) Date of Patent: *Nov. 17, 2009

(54) SIZE/SCALE AND ORIENTATION DETERMINATION OF A POINTER IN A CAMERA-BASED TOUCH SYSTEM

(75) Inventors: Gerald Morrison, Calgary (CA); Trevor Akitt, Calgary (CA); Scott Su, Calgary (CA)

(73) Assignee: Smart Technologies ULC (CA)

( * ) Notice: Subject to any disclaimer, the term of this patent is extended or adjusted under 35 U.S.C. 154(b) by 413 days.

This patent is subject to a terminal disclaimer.

(21) Appl. No.: 11/236,622

(22) Filed: Sep. 28, 2005

(65) Prior Publication Data

US 2006/0022962 A1    Feb. 2, 2006

Related U.S. Application Data

(63) Continuation of application No. 10/294,917, filed on Nov. 15, 2002, now Pat. No. 6,954,197.

(51) Int. Cl.  
G06F 3/041 (2006.01)

(52) U.S. Cl. .................. 345/173; 345/178

(58) Field of Classification Search .......... 345/39, 345/156–158, 168–175, 180–184; 178/18.01–18.04; 219/121.83, 121.69; 348/39  
See application file for complete search history.

(56) References Cited

U.S. PATENT DOCUMENTS

| 4,107,522 A | 8/1978 | Walter |
| 4,144,449 A | 3/1979 | Funk et al. |
| 4,247,767 A | 1/1981 | O'Brien et al. |
| 4,507,557 A | 3/1985 | Tsikos ......................... 250/341 |
| 4,558,313 A | 12/1985 | Garwin |
| 4,737,631 A | 4/1988 | Sasaki |
| 4,742,221 A | 5/1988 | Sasaki et al. ................ 250/221 |

(Continued)

FOREIGN PATENT DOCUMENTS

CA        2412878        1/2002

(Continued)

OTHER PUBLICATIONS

Bernhard P. Wrobel, "Minimum Solutions for Orientation", Calibration and Orientation of Cameras in Computer Vision, Springer Series in Information Sciences, vol. 34, 2001, pp. 28-33.

(Continued)

*Primary Examiner*—Prabodh M Dharia  
(74) *Attorney, Agent, or Firm*—Katten Muchin Rosenman LLP

(57) ABSTRACT

A touch system includes a touch surface and at least two cameras associated with the touch surface. The at least two cameras acquire images of the touch surface from different locations and having overlapping fields of view. A digital signal processor is associated with each camera. The digital signal processors process pixel data acquired by selected pixel subsets of the at least two digital cameras to generate pointer characteristic data when a pointer exists in the acquired images. The pointer characteristic data identifies edges of the pointer. A master digital signal processor triangulates the edge information in the pointer characteristic data to determine a bounding area that represents a pointer perimeter.

48 Claims, 6 Drawing Sheets

U.S. PATENT DOCUMENTS

| | | | |
|---|---|---|---|
| 4,746,770 A | 5/1988 | McAvinney | 178/18 |
| 4,762,990 A | 8/1988 | Caswell et al. | |
| 4,782,328 A | 11/1988 | Denlinger | |
| 4,818,826 A | 4/1989 | Kimura | 178/19 |
| 4,820,050 A | 4/1989 | Griffin | |
| 4,822,145 A | 4/1989 | Staelin | |
| 4,831,455 A | 5/1989 | Ishikawa | |
| 4,868,912 A | 9/1989 | Doering | |
| 4,980,547 A | 12/1990 | Griffin | |
| 5,025,314 A | 6/1991 | Tang et al. | |
| 5,097,516 A | 3/1992 | Amir | |
| 5,109,435 A | 4/1992 | Lo et al. | |
| 5,130,794 A * | 7/1992 | Ritchey | 348/39 |
| 5,140,647 A | 8/1992 | Ise et al. | |
| 5,196,835 A | 3/1993 | Blue et al. | |
| 5,239,373 A | 8/1993 | Tang et al. | |
| 5,317,140 A | 5/1994 | Dunthorn | 250/211 |
| 5,359,155 A | 10/1994 | Helser | |
| 5,374,971 A | 12/1994 | Clapp et al. | |
| 5,448,263 A | 9/1995 | Martin | |
| 5,483,261 A | 1/1996 | Yasutake | |
| 5,483,603 A | 1/1996 | Luke et al. | |
| 5,484,966 A | 1/1996 | Segen | |
| 5,490,655 A | 2/1996 | Bates | |
| 5,502,568 A | 3/1996 | Ogawa et al. | 356/375 |
| 5,528,263 A | 6/1996 | Platzker et al. | |
| 5,528,290 A | 6/1996 | Saund | |
| 5,537,107 A | 7/1996 | Funado | |
| 5,554,828 A | 9/1996 | Primm | |
| 5,581,276 A | 12/1996 | Cipolla et al. | |
| 5,581,637 A | 12/1996 | Cass et al. | |
| 5,594,502 A | 1/1997 | Bito et al. | |
| 5,638,092 A | 6/1997 | Eng et al. | |
| 5,670,755 A | 9/1997 | Kwon | |
| 5,729,704 A | 3/1998 | Stone et al. | |
| 5,734,375 A | 3/1998 | Knox et al. | |
| 5,736,686 A | 4/1998 | Perret, Jr. et al. | |
| 5,737,740 A | 4/1998 | Henderson et al. | |
| 5,745,116 A | 4/1998 | Pisutha-Arnond | |
| 5,764,223 A | 6/1998 | Chang et al. | |
| 5,771,039 A | 6/1998 | Ditzik | |
| 5,790,910 A | 8/1998 | Haskin | |
| 5,818,421 A | 10/1998 | Ogino et al. | |
| 5,818,424 A | 10/1998 | Korth | |
| 5,819,201 A | 10/1998 | DeGraaf | |
| 5,825,352 A | 10/1998 | Bisset et al. | |
| 5,831,602 A | 11/1998 | Sato et al. | |
| 5,911,004 A | 6/1999 | Ohuchi et al. | |
| 5,914,709 A | 6/1999 | Graham et al. | |
| 5,920,342 A | 7/1999 | Umeda et al. | |
| 5,936,615 A * | 8/1999 | Waters | 345/173 |
| 5,943,783 A | 8/1999 | Jackson | |
| 5,963,199 A | 10/1999 | Kato et al. | |
| 5,982,352 A | 11/1999 | Pryor | 345/156 |
| 5,988,645 A | 11/1999 | Downing | |
| 6,002,808 A | 12/1999 | Freeman | |
| 6,008,798 A | 12/1999 | Mato, Jr. et al. | 345/168 |
| 6,031,531 A | 2/2000 | Kimble | |
| 6,061,177 A | 5/2000 | Fujimoto | |
| 6,075,905 A | 6/2000 | Herman et al. | |
| 6,100,538 A | 8/2000 | Ogawa | 250/559.38 |
| 6,104,387 A | 8/2000 | Chery et al. | |
| 6,118,433 A | 9/2000 | Jenkin et al. | |
| 6,122,865 A | 9/2000 | Branc et al. | |
| 6,141,000 A | 10/2000 | Martin | |
| 6,153,836 A | 11/2000 | Goszyk | |
| 6,161,066 A | 12/2000 | Wright et al. | |
| 6,179,426 B1 | 1/2001 | Rodriguez, Jr. et al. | |
| 6,191,773 B1 | 2/2001 | Maruno et al. | |
| 6,208,329 B1 | 3/2001 | Ballare | |
| 6,208,330 B1 | 3/2001 | Hasegawa et al. | 345/173 |
| 6,209,266 B1 | 4/2001 | Branc et al. | |
| 6,226,035 B1 | 5/2001 | Korein et al. | |
| 6,252,989 B1 | 6/2001 | Geisler et al. | |
| 6,256,033 B1 | 7/2001 | Nguyen | |
| 6,262,718 B1 | 7/2001 | Findlay et al. | |
| 6,310,610 B1 | 10/2001 | Beaton et al. | |
| 6,323,846 B1 | 11/2001 | Westerman | |
| 6,328,270 B1 | 12/2001 | Elberbaum | |
| 6,335,724 B1 | 1/2002 | Takekawa et al. | 345/173 |
| 6,337,681 B1 | 1/2002 | Martin | |
| 6,339,748 B1 | 1/2002 | Hiramatsu | |
| 6,353,434 B1 | 3/2002 | Akebi | |
| 6,359,612 B1 | 3/2002 | Peter et al. | |
| 6,414,671 B1 | 7/2002 | Gillespie et al. | 345/157 |
| 6,414,673 B1 | 7/2002 | Wood et al. | |
| 6,421,042 B1 | 7/2002 | Omura et al. | 345/157 |
| 6,427,389 B1 | 8/2002 | Branc et al. | |
| 6,429,856 B1 | 8/2002 | Omura et al. | |
| 6,496,122 B2 | 12/2002 | Sampsell | |
| 6,497,608 B2 | 12/2002 | Ho et al. | |
| 6,507,339 B1 | 1/2003 | Tanaka | |
| 6,512,838 B1 | 1/2003 | Rafii et al. | |
| 6,517,266 B2 | 2/2003 | Saund | |
| 6,518,600 B1 | 2/2003 | Shaddock | |
| 6,522,830 B2 | 2/2003 | Yamagami | |
| 6,529,189 B1 | 3/2003 | Colgan et al. | |
| 6,530,664 B2 | 3/2003 | Vanderwerf et al. | |
| 6,531,999 B1 | 3/2003 | Trajkovic | 345/157 |
| 6,545,669 B1 | 4/2003 | Kinawi et al. | |
| 6,559,813 B1 | 5/2003 | DeLuca et al. | |
| 6,563,491 B1 | 5/2003 | Omura | 345/173 |
| 6,567,078 B2 | 5/2003 | Ogawa | |
| 6,567,121 B1 | 5/2003 | Kuno | |
| 6,570,612 B1 | 5/2003 | Saund et al. | |
| 6,587,099 B2 | 7/2003 | Takekawa | |
| 6,594,023 B1 | 7/2003 | Omura et al. | |
| 6,608,619 B2 * | 8/2003 | Omura et al. | 345/175 |
| 6,626,718 B2 | 9/2003 | Hiroki | |
| 6,630,922 B2 | 10/2003 | Fishkin et al. | |
| 6,633,328 B1 | 10/2003 | Byrd et al. | |
| 6,650,822 B1 | 11/2003 | Zhou | |
| 6,674,424 B1 | 1/2004 | Fujioka | |
| 6,683,584 B2 * | 1/2004 | Ronzani et al. | 345/8 |
| 6,690,363 B2 | 2/2004 | Newton | |
| 6,690,397 B1 | 2/2004 | Daignault, Jr. | |
| 6,710,770 B2 | 3/2004 | Tomasi et al. | 345/168 |
| 6,741,250 B1 * | 5/2004 | Furlan et al. | 345/427 |
| 6,747,636 B2 | 6/2004 | Martin | |
| 6,756,910 B2 | 6/2004 | Ohba et al. | |
| 6,760,009 B2 | 7/2004 | Omura et al. | |
| 6,760,999 B2 | 7/2004 | Branc et al. | |
| 6,774,889 B1 | 8/2004 | Zhang et al. | |
| 6,803,906 B1 | 10/2004 | Morrison et al. | 345/173 |
| 6,864,882 B2 | 3/2005 | Newton | |
| 6,919,880 B2 | 7/2005 | Morrison et al. | |
| 6,933,981 B1 | 8/2005 | Kishida et al. | |
| 6,972,401 B2 | 12/2005 | Akitt et al. | |
| 6,972,753 B1 | 12/2005 | Kimura et al. | |
| 7,007,236 B2 | 2/2006 | Dempski et al. | |
| 7,015,418 B2 * | 3/2006 | Cahill et al. | 219/121.69 |
| 7,030,861 B1 | 4/2006 | Westerman | |
| 7,084,868 B2 * | 8/2006 | Farag et al. | 345/419 |
| 7,098,392 B2 | 8/2006 | Sitrick et al. | |
| 7,121,470 B2 | 10/2006 | McCall et al. | |
| 7,184,030 B2 * | 2/2007 | McCharles et al. | 345/173 |
| 7,187,489 B2 | 3/2007 | Miles | |
| 7,190,496 B2 * | 3/2007 | Klug et al. | 359/23 |
| 7,202,860 B2 | 4/2007 | Ogawa | |
| 7,232,986 B2 | 6/2007 | Worthington et al. | |
| 7,236,132 B1 | 6/2007 | Morrison et al. | |
| 7,274,356 B2 | 9/2007 | Ung et al. | |
| 7,355,593 B2 * | 4/2008 | Hill et al. | 345/173 |
| 7,414,617 B2 | 8/2008 | Ogawa | |

| | | | | | |
|---|---|---|---|---|---|
| 2001/0019325 A1 | 9/2001 | Takekawa ............... 345/157 | JP | 9-224111 A | 8/1997 |
| 2001/0022579 A1 | 9/2001 | Hirabayashi ............. 345/175 | JP | 9-319501 | 12/1997 |
| 2001/0026268 A1 | 10/2001 | Ito ............................ 345/175 | JP | 10-105324 A | 4/1998 |
| 2001/0033274 A1 | 10/2001 | Ong | JP | 2003-167669 A | 6/2003 |
| 2002/0036617 A1 | 3/2002 | Pryor | JP | 2003-173237 A | 6/2003 |
| 2002/0050979 A1 | 5/2002 | Oberoi et al. | JP | 2001-282456 A | 11/2007 |
| 2002/0067922 A1 | 6/2002 | Harris | WO | 98/07112 A2 | 2/1998 |
| 2002/0080123 A1 | 6/2002 | Kennedy et al. | WO | 99/08897 | 2/1999 |
| 2002/0145595 A1 | 10/2002 | Satoh | WO | 99/21122 A1 | 4/1999 |
| 2002/0163530 A1 | 11/2002 | Takakura et al. | WO | WO 99/40562 | 8/1999 |
| 2003/0001825 A1 | 1/2003 | Omura et al. ............. 345/173 | WO | 02/03316 A1 | 1/2002 |
| 2003/0025951 A1 | 2/2003 | Pollard et al. | WO | 02/27461 A1 | 4/2002 |
| 2003/0043116 A1 | 3/2003 | Morrison et al. | WO | 03/105074 A2 | 12/2003 |
| 2003/0046401 A1 | 3/2003 | Abbott et al. | WO | 2005/106775 A1 | 11/2005 |
| 2003/0063073 A1 | 4/2003 | Geaghan et al. | WO | 2007/003196 A2 | 1/2007 |
| 2003/0071858 A1 | 4/2003 | Morohoshi | WO | 2007/064804 A1 | 6/2007 |
| 2003/0085871 A1 | 5/2003 | Ogawa | | | |
| 2003/0095112 A1 | 5/2003 | Kawano et al. | | | |
| 2003/0151532 A1 | 8/2003 | Chen et al. | | | |
| 2003/0151562 A1 | 8/2003 | Kulas | | | |
| 2004/0021633 A1 | 2/2004 | Rajkowski | | | |
| 2004/0031779 A1* | 2/2004 | Cahill et al. ........... 219/121.83 | | | |
| 2004/0046749 A1 | 3/2004 | Ikeda | | | |
| 2004/0108990 A1 | 6/2004 | Lieberman | | | |
| 2004/0149892 A1 | 8/2004 | Akitt et al. | | | |
| 2004/0150630 A1 | 8/2004 | Hinckley et al. | | | |
| 2004/0169639 A1 | 9/2004 | Pate et al. | | | |
| 2004/0178993 A1 | 9/2004 | Morrison et al. | | | |
| 2004/0178997 A1 | 9/2004 | Gillespie et al. | | | |
| 2004/0179001 A1 | 9/2004 | Morrison et al. | | | |
| 2004/0189720 A1 | 9/2004 | Wilson et al. | | | |
| 2004/0252091 A1 | 12/2004 | Ma et al. | | | |
| 2005/0052427 A1 | 3/2005 | Wu et al. | | | |
| 2005/0057524 A1 | 3/2005 | Hill et al. | | | |
| 2005/0083308 A1 | 4/2005 | Homer et al. | | | |
| 2005/0151733 A1 | 7/2005 | Sander et al. | | | |
| 2005/0190162 A1 | 9/2005 | Newton | | | |
| 2005/0248540 A1 | 11/2005 | Newton | | | |
| 2005/0276448 A1 | 12/2005 | Pryor | | | |
| 2006/0158437 A1 | 7/2006 | Blythe et al. | | | |
| 2006/0202953 A1 | 9/2006 | Pryor et al. | | | |
| 2006/0227120 A1 | 10/2006 | Eikman | | | |
| 2006/0274067 A1 | 12/2006 | Hidai | | | |
| 2007/0075648 A1 | 4/2007 | Blythe et al. | | | |
| 2007/0075982 A1 | 4/2007 | Morrison et al. | | | |
| 2007/0126755 A1 | 6/2007 | Zhang et al. | | | |
| 2007/0139932 A1 | 6/2007 | Sun et al. | | | |
| 2007/0236454 A1 | 10/2007 | Ung et al. | | | |
| 2008/0129707 A1 | 6/2008 | Pryor | | | |

FOREIGN PATENT DOCUMENTS

| | | | |
|---|---|---|---|
| CA | 2493236 A1 | 12/2003 | |
| DE | 198 10 452 | 12/1998 | |
| EP | 0279652 A | 8/1988 | |
| EP | 0347725 A2 | 12/1989 | |
| EP | 0 657 841 A1 | 6/1995 | |
| EP | 0762319 A2 | 3/1997 | |
| EP | 0829798 A2 | 3/1998 | |
| EP | 1 450 243 A2 | 8/2004 | |
| EP | 1 297 488 B1 | 11/2006 | |
| GB | 2204126 A | 11/1988 | |
| JP | 57-211637 | 12/1982 | |
| JP | 8-108689 A | 4/1996 | |
| JP | 8-240407 | 9/1996 | |
| JP | 9-91094 | 4/1997 | |

OTHER PUBLICATIONS

Kenichi Kanatani, "Camera Calibration", Geometric Computation for Machine Vision, Oxford Engineering Science Series, vol. 37, 1993, pp. 56-63.

Richard Hartley and Andrew Zisserman, "Multiple View Geometry in Computer Vision", Cambridge University Press, First published 2000, Reprinted (with corrections) 2001, pp. 70-73, 92-93, and 98-99.

Wolfgang Förstner, "On Estimating Rotations", Festschrift für Prof. Dr.-Ing. Heinrich Ebner zum 60. Geburtstag, Herausg.: C. Heipke und H Mayer, Lehrstuhl für Photogrammetrie und Fernerkundung, TU München, 1999, 12 pages. (http://www.ipb.uni-bonn.de/papers/#1999).

European Search Report for EP 06 01 9269 for a search that was completed on Nov. 9, 2006.

European Search Report for EP 06 01 9268 for a search that was completed on Nov. 9, 2006.

European Search Report for EP 02 25 3594 for a search that was completed on Dec. 14, 2005.

European Search Report for EP 04 25 1392 for a search that was completed on Jan. 11, 2007.

Wang, Fie-Yue, "Stereo camera calibration without absolute world coordinate information", SPIE, vol. 2620, pp. 655-662, Jun. 14, 1995.

Bud K. Funk, CCDs in optical panels deliver high resolution, Electronic Design, Sep. 27, 1980, pp. 139-143.

International Search Report with a date of mailing of Oct. 22, 2001 for PCTICA 01100980 with an International Filing Date of Jul. 5, 2001.

International Search Report for PCT/CA2008/001350 mailed Oct. 17, 2008 (5 Pages).

International Search Report and Written Opinion for PCT/CA2007/002184 mailed Mar. 13, 2008 (13 Pages).

International Search Report and Written Opinion for PCT/CA2004/001759 mailed Feb. 21, 2005 (7 Pages).

European Search Opinion for EP 07 25 0888 dated Jun. 22, 2007 (2 pages).

European Search Report for EP 07 25 0888 dated Jun. 22, 2007 (2 pages).

Tapper, C.C., et al., "On-Line Handwriting Recognition - A Survey", Proceedings of the International Conference on Pattern Recognition (ICPR), Rome, Nov. 14-17, 1988, Washington, IEEE Comp. Soc. Press. US, vol. 2 Conf. 9, Nov. 14, 1988 (Nov. 14, 1988), pp. 1123-1132.

May 12, 2009 Office Action for Canadian Patent Application No. 2,412,878.

* cited by examiner

SIZE/SCALE AND ORIENTATION DETERMINATION OF A POINTER IN A CAMERA-BASED TOUCH SYSTEM

This application is a continuation of U.S. patent application Ser. No. 10/294,917, filed Nov. 15, 2002 (now U.S. Pat. No. 6,954,197), incorporated herein by reference.

FIELD OF THE INVENTION

The present invention relates generally to camera-based touch systems and in particular to a method of determining the size/scale and orientation of a pointer in a camera-based touch system and to a camera-based touch system employing pointer size/scale and orientation determination.

BACKGROUND OF THE INVENTION

Camera-based touch systems that use optical recording devices such as cameras to acquire images of a touch surface and process the image data to determine the position of a pointer relative to the touch surface are known. For example, International PCT Application No. WO 02/03316 to Smart Technologies Inc. et al discloses a camera-based touch system including a touch surface and a plurality of cameras associated with the touch surface. The cameras have overlapping fields of view encompassing the touch surface. The cameras acquire images of the touch surface from different locations and generate image data. Processing circuitry receives and processes the image data generated by the cameras to determine the location of a pointer captured in the images relative to the touch surface using triangulation.

In particular, a processor associated with each camera receives the image data generated by the camera and processes the image data to detect the existence of the pointer in the image. Pointer information packets (PIPs) are generated by the camera processors when the pointer exists in the captured images. The PIPs, among other things, identify the pointer and either its tip or its median line. The tip or median line data in the PIPs is then processed by a master controller to determine the position of the pointer relative to the touch surface using triangulation.

Although the above-identified camera-based touch system provides significant advantages over other types of prior art passive touch systems such as analog resistive, surface acoustic wave and capacitive touch systems, improvements are always desired. Since the above-described camera-based touch system uses single point triangulation to determine the position of the pointer relative to the touch surface, resolution is limited. In addition, the camera-based touch system does not readily provide for resolution of pointer ambiguity. Accordingly, there is a need for an improved camera-based touch system.

It is therefore an object of the present invention to provide a novel method of determining the size/scale and orientation of a pointer in a camera-based touch system and to a camera-based touch system employing pointer size/scale and orientation determination.

SUMMARY OF THE INVENTION

According to one aspect of the present invention there is provided a touch system comprising:

at least two optical devices associated with a touch surface, said at least two optical recording devices acquiring images of said touch surface from different locations and having overlapping fields of view; and processing circuitry processing image data acquired by said at least two optical recording devices to detect edges of a pointer in said images and to triangulate the detected edges to determine a bounding area that defines a pointer perimeter.

Preferably, the processing circuitry further determines the center of the bounding area thereby to determine the center of the pointer. It is also preferred that the processing circuitry examines the shape of the bounding area to determine the orientation of the pointer relative to the touch surface.

In one embodiment, the touch surface is generally rectangular and an optical recording device is positioned adjacent each corner of the touch surface. The processing circuitry triangulates detected edges in images captured by multiple pairs of optical recording devices to yield multiple bounding areas. The smallest bounding area is selected as the bounding area defining the pointer perimeter. The processing circuitry averages the centers of the multiple bounding areas to determine the center of the pointer.

In a preferred form, the optical recording devices are CMOS digital cameras having selectable pixels arrays. Pixel data from subsets of the pixel arrays is processed by the processing circuitry. The processing circuitry includes a camera processor associated with each digital camera to process pixel data and detect edges of the pointer. A master processor triangulates the detected edges to yield the multiple bounding areas and selects the smallest bounding area as the bounding area representing the pointer perimeter.

Preferably pixel data at least from pixel rows capturing the region of the pointer in contact with the touch surface is processed to determine the bounding area. It is further preferred that pixel data from pixel rows capturing regions of the pointer along its length are processed to yield a series of bounding areas, the bounding areas being stacked to generate a volumetric representation of the pointer.

In another embodiment, the processing circuitry superimposes a model over the bounding area with the model defining the pointer perimeter. The processing circuitry examines parameters of the model thereby to determine the center or tip location of the pointer. The model may take the form of a rectangular box centered over the bounding area.

According to another aspect of the present invention there is provided a touch system comprising:

at least two digital cameras associated with a touch surface, said at least two digital cameras acquiring images of said touch surface from different locations and having overlapping fields of view; and processing circuitry processing pixel data acquired by said at least two digital cameras to detect edges of a pointer in said images and to triangulate the detected edges to determine at least one bounding area that represents a pointer perimeter.

According to yet another aspect of the present invention there is provided a touch system comprising:

a touch surface;

at least two cameras associated with said touch surface, said at least two cameras acquiring images of said touch surface from different locations and having overlapping fields of view;

a digital signal processor associated with each camera, the digital signal processors associated with said at least two cameras processing pixel data acquired by selected pixel subsets of the at least two digital cameras to generate pointer characteristic data when a pointer exists in said acquired images, said pointer characteristic data identifying edges of said pointer; and a master digital signal processor triangulating the edge information in said pointer characteristic data to determine a bounding area defining a pointer perimeter.

According to still yet another aspect of the present invention there is provided a method of detecting the perimeter of a pointer relative to a touch surface comprising the steps of:

acquiring multiple images of a pointer relative to said touch surface;

processing pixel data resulting from said images to detect edges of said pointer; and triangulating the detected edges to determine a bounding area representing said perimeter.

According to still yet another aspect of the present invention there is provided a method of erasing electronic ink presented on a touch surface in response to movement of a pointer over said touch surface, said method comprising the steps of:

tracking movement of said pointer over said touch surface;

determining the perimeter of the pointer that is in contact with said touch surface; and erasing electronic ink contacted by said determined perimeter.

Since two or more cameras acquire an image of the pointer when the pointer is adjacent the touch surface, the edge co-ordinates of the pointer generated by each camera define a bounding area that represents the pointer perimeter. The size and the orientation of the bounding area allows the size and orientation of the pointer to be determined. In addition, parameters of the bounding area can be used to determine the center or tip location of the pointer. Using this bounding area data to locate the pointer tip provides increased pointer position determination accuracy than is achievable using single point triangulation. This is due to the fact that by selecting the minimum bounding area, noise in the captured images that can create jitter, is reduced.

The present invention provides further advantages in that when more than two cameras are used, if one of the triangulation camera pairs yields a poor bounding area result, the other triangulation camera pairs are automatically used to determine the bounding area.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENTS

Figure 1:
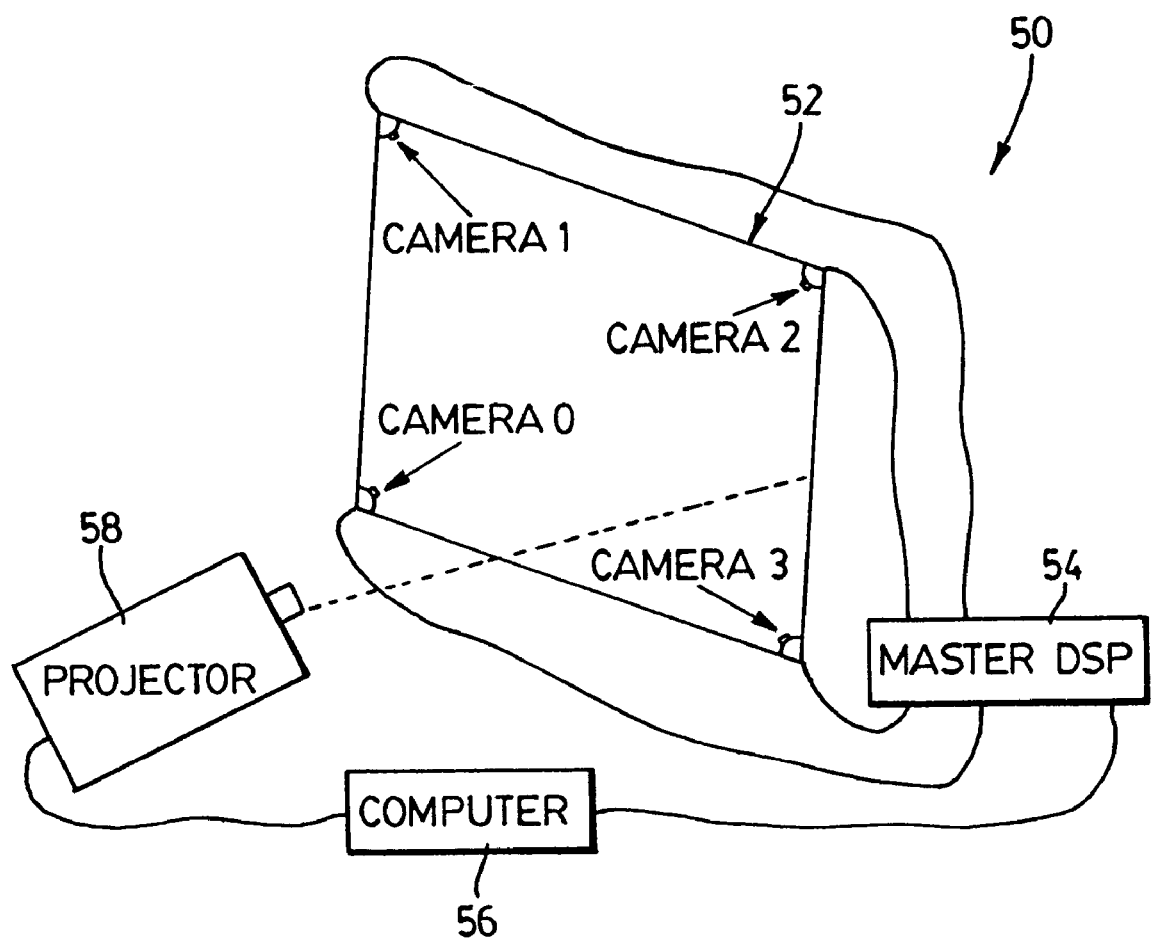
FIG. 1 is a schematic diagram of a camera-based touch system in accordance with the present invention.

Turning now to FIG. 1, a camera-based touch system such as that described in International PCT No. WO 02/03316 filed on Jul. 5, 2001, assigned to the assignee of the present invention, the contents of which are incorporated herein by reference, is shown and is generally identified by reference numeral 50. As can be seen, touch system 50 includes a touch screen 52 coupled to a digital signal processor (DSP) based master controller 54. Master controller 54 is also coupled to a computer 56. Computer 56 executes one or more application programs and provides display output that is presented on the touch screen 52 via a projector 58. The touch screen 52, master controller 54, computer 56 and projector 58 form a closed-loop so that user contacts with the touch screen 52 can be recorded as writing, drawing or erasing or can be used to control execution of application programs executed by the computer 56. In the case of writing or drawing, electronic ink corresponding to pointer movement over the touch screen is presented. In the case of erasing, presented electronic ink contacted by the pointer is removed.

Figure 2:
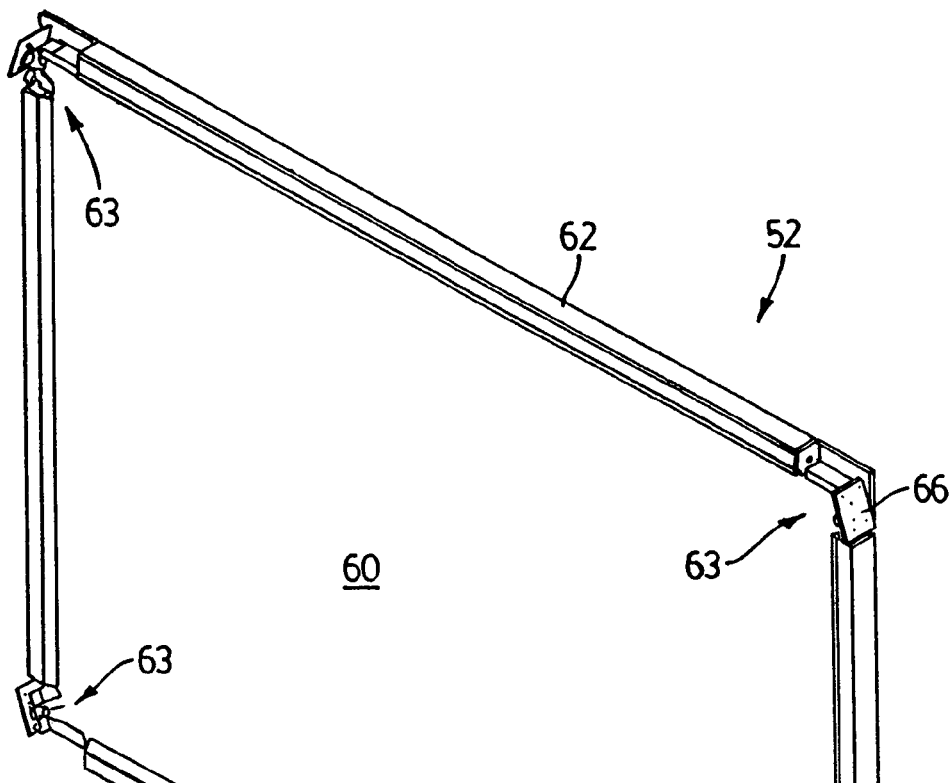
FIG. 2 is an isometric view of a touch screen forming part of the touch system of FIG. 1.
Figure 3:
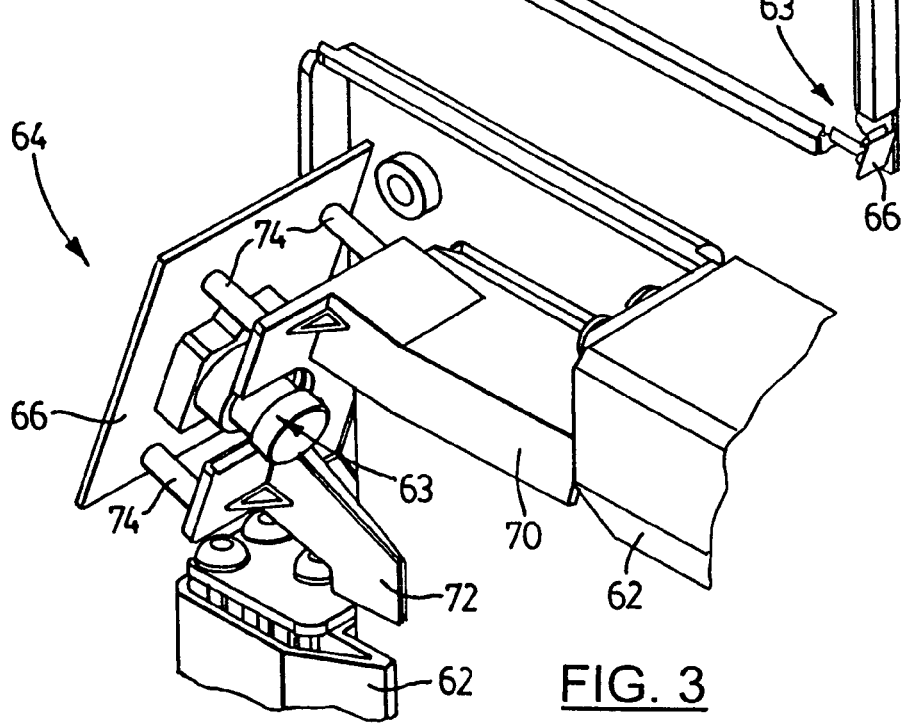
FIG. 3 is an isometric view of a corner portion of the touch screen of FIG. 2.
Figure 4:
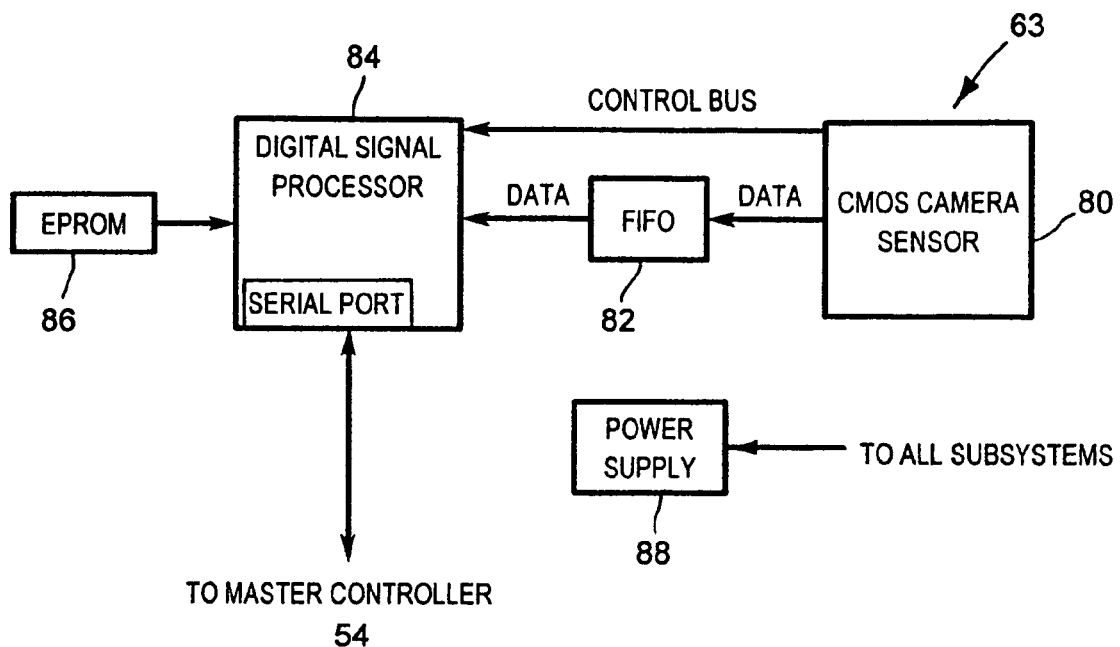
FIG. 4 is a schematic diagram of a digital camera forming part of the touch screen of FIG. 2.

FIGS. 2 to 4 better illustrate the touch screen 52. Touch screen 52 includes a touch surface 60 bordered by a rectangular frame or bezel 62. Touch surface 60 is in the form of a rectangular planar sheet of passive material but may in fact be any suitable surface. Optical recording devices in the form of DSP-based CMOS digital cameras $63_0$ to $63_3$ are positioned adjacent each corner of the touch screen 52. Each digital camera $63_N$ is mounted on a frame assembly 64. Each frame assembly 64 includes an angled support plate 66 on which the digital camera $63_N$ is mounted. Supporting frame elements 70 and 72 are mounted on the plate 66 by way of posts 74 and secure the plate 66 to the frame 62.

Each digital camera $63_N$ includes a two-dimensional CMOS image sensor 80 having an associated lens assembly, a first-in-first-out (FIFO) buffer 82 coupled to the image sensor 80 by a data bus and a digital signal processor (DSP) 84 coupled to the FIFO 82 by a data bus and to the image sensor 80 by a control bus. A boot EPROM 86 and a power supply subsystem 88 are also included.

In the present embodiment, the CMOS camera image sensor 80 is a National LM9617 image sensor configured for a 640×20 pixel subarray that can be operated to capture image frames at rates in excess of 200 frames per second. Arbitrary pixel rows of the image sensor 80 can be selected. Since the pixel rows can be arbitrarily selected, the pixel subarray can be exposed for a greater duration for a given digital camera frame rate providing for good operation in darker rooms in addition to well lit rooms. The FIFO buffer 82 is manufactured by Cypress under part number CY7C4211V and the DSP 84 is manufactured by Analog Devices under part number ADSP2185M.

The DSP 84 receives and processes image frames from the image sensor 80 to determine the edges of a pointer within the image frames. In addition, the DSP 84 provides control information to the image sensor 80 via the control bus. The control information allows the DSP 84 to control perimeters of the image sensor 80 such as exposure, gain, array configuration, reset and initialization. The DSP 84 also provides clock signals to the image sensor 80 to control the frame rate of the image sensor 80.

Figure 6:
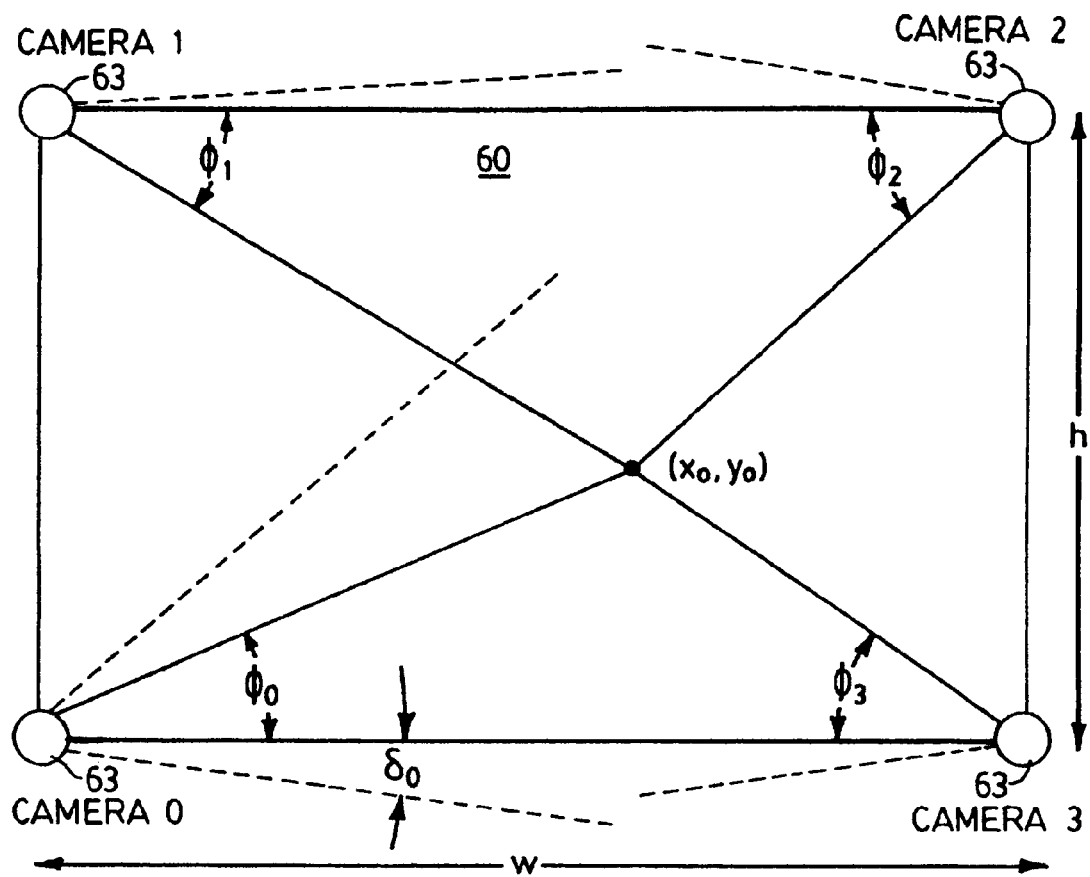
FIG. 6 shows triangulation geometry used to calculate a pointer contact position on the touch surface of the touch screen.

The angle of the plate 66 and the optics of the digital cameras $63_N$ are selected so that the field of view (FOV) of each digital camera $63_N$ is slightly beyond 90°. In this way, the entire touch surface 60 is within the field of view of each digital camera $63_N$ with the field of view of each digital camera $63_N$ extending slightly beyond a designated peripheral edge of the touch surface 60 as shown in FIG. 6.

Figure 5:
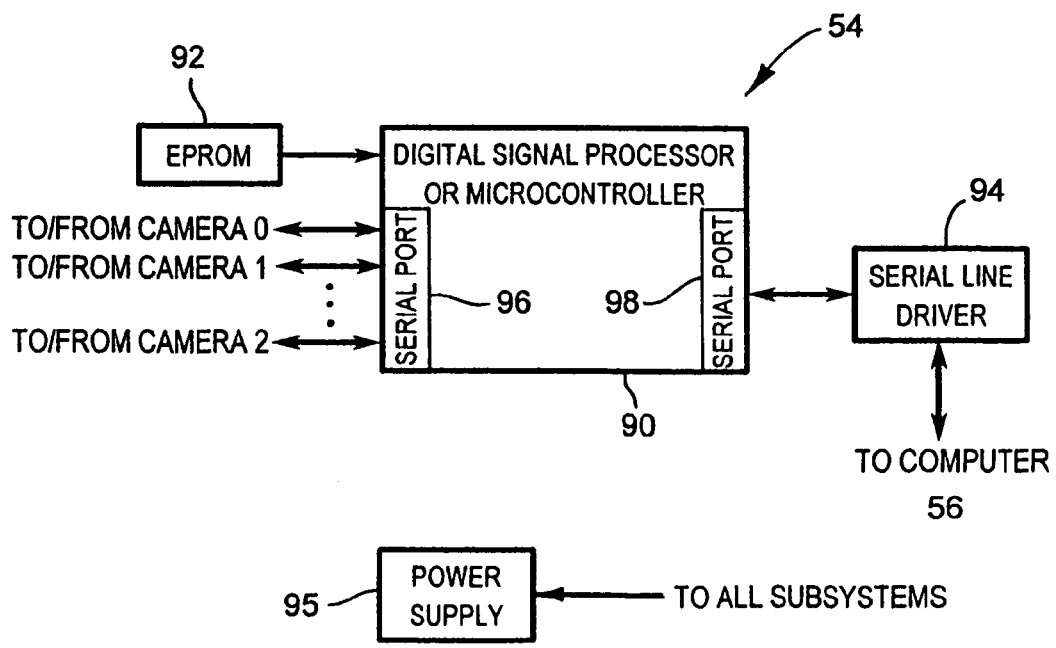
FIG. 5 is a schematic diagram of a master controller forming part of the touch system of FIG. 1.

Master controller 54 is best illustrated in FIG. 5 and includes a DSP 90, a boot EPROM 92, a serial line driver 94 and a power supply subsystem 95. The DSP 90 communicates with the DSPs 84 of the digital cameras 630 to 633 over a data bus via a serial port 96 and communicates with the computer 56 over a data bus via a serial port 98 and the serial line driver 94. In this embodiment, the DSP 90 is manufactured by Analog Devices under part number ADSP2185M. The serial line driver 94 is manufactured by Analog Devices under part number ADM222.

The master controller 54 and each digital camera $63_N$ follow a communication protocol that enables bi-directional communications via a common serial cable similar to a universal serial bus (USB). The transmission bandwidth is divided into thirty-two (32) 16-bit channels. Of the thirty-two channels, six (6) channels are assigned to each of the DSPs 84 in the digital cameras 630 to 633 and to the DSP 90 in the master controller 54 and the remaining two (2) channels are unused. The master controller 54 monitors the twenty-four (24) channels assigned to the DSPs 84. The DSPs 84 monitor the six (6) channels assigned to the DSP 90 of the master controller 54. Communications between the master controller 54 and the digital cameras $63_0$ to $63_3$ are performed as background processes in response to interrupts.

The operation of the touch system 50 will now be described. Initially, a camera offset angle calibration routine is performed to determine the offset angle δ of each digital camera $63_N$ (see FIG. 6). Details of the camera offset angle calibration are described in Applicants' co-pending U.S. application Ser. No. 09/870,698 entitled "Calibrating Camera Offsets to Facilitate Object Position Determination Using Triangulation" filed on Jun. 1, 2001, the contents of which are incorporated herein by reference.

With the touch system 50 calibrated, each digital camera $63_N$ acquires image frames of the touch surface 60 within the field of view of its image sensor 80 at a desired frame rate and loads the pixel data associated with the selected pixel subarray into the FIFO buffer 82. The DSP 84 in turn reads the pixel data from the FIFO buffer 82 and processes the pixel data to determine if a pointer exists in the image frame.

If a pointer is in the acquired image frame, the pixel data is further processed by the DSP 84 to determine the edges of the pointer visible to the digital camera $63_N$ in each pixel row of the subarray. In the present embodiment, a combination of image contrast with a differentiating edge detector is used. Specifics concerning edge detection can be found in "The Image Processing Handbook", Fourth Edition by John C. Russ, CRC Press, Publication Date: Jul. 26, 2002, Chapter 4: Image Enhancement and in "Algorithms for Image Processing and Computer Vision" by J. R. Parker, Wiley Computer Publishing, Publication Date: 1997, Chapter 1: Advanced Edge Detection Techniques. The z-position of the pointer is also determined so that a determination can be made as to whether the pointer is contacting or hovering above the touch surface 60. Pointer information packets (PIPs), including the pointer edge and contact or hover data, status and/or diagnostic information, are then generated by the DSP 84 and the PIPs are queued for transmission to the master controller 54. The digital cameras $63_0$ to $63_3$ also receive and respond to command PIPs generated by the master controller 54.

The master controller 54 polls the digital cameras $63_0$ to $63_3$ for PIPs in the queues. In this particular embodiment, the master controller 54 polls the digital cameras at a rate exceeding the image sensor frame rates. Upon receipt of PIPs from the digital cameras $63_N$, the master controller 54 examines the PIPs to determine if the PIPs include pointer edge data. If the PIPs include pointer edge data, the master controller 54 triangulates the pointer edge data in the PIPs to determine bounding areas in which the pointer is located.

During triangulation, triangulation is performed in respect of each pair of cameras capturing images of the pointer with the exception of the diagonal digital camera pairs and for each pixel row to yield a plurality of bounding areas. The minimum bounding area, which may range from a four-sided polygon to an eight-sided polygon, for each pixel row is then selected to reduce the effects of erroneous or suboptimal measurements. Once the minimum bounding area for each pixel row has been selected, a model, in the present embodiment a rectangular box whose size is a function of the size of the minimum bounding area, is superimposed on the bounding area and defines the pointer perimeter and hence pointer size at that pixel row. The size of the box describes the pointer size in terms of pixels by height and width.

In order to determine the centre of the pointer at a selected pixel row, the parameters of the model such as its center, superimposed on each bounding area is determined and the centers are averaged to determine the pointer center in sub-pixel accuracy.

The size and orientation of the model superimposed on the smallest bounding area for each pixel row is used by the master controller 54 to determine the size and orientation of the pointer. Knowing the size of pointer helps to reduce pointer ambiguity. If there is prior knowledge concerning the pointer size, then the acquired bounding areas can be used to identify quickly potential pointers from other objects captured in the camera images. Objects that are too large or too small as compared to the historical pointer size can be discarded as erroneous.

Knowing the orientation of the pointer can be important depending on the shape of the pointer. If the bounding area is circular, the pointer is a cylindrical and pointer orientation is not important. However, if the bounding area is rectangular in shape then pointer orientation becomes important. For example in the case of a pointer in the form of a standard rectangular chalk board eraser, if the longest side of the rectangular eraser runs up and down, then it can be determined that the eraser is held in a vertical orientation. Likewise if the longest side of the rectangular eraser runs left to right, then it can be determined that the eraser is held in a horizontal orientation. Being able to determine pointer orientation is particularly beneficial when performing an erasing function since erasing can be limited to the pointer perimeter contacting the touch surface regardless of the pointer size. This is substantially different from single point contact touch systems that erase a predefined area surrounding a touch surface contact irrespective of pointer size and orientation.

The master controller 54 also calculates a volumetric representation of the pointer by examining the model superimposed on the minimum bounding area associated with each pixel row of the subarray. Changes in size of the model enable the configuration of the pointer to be determined. For example, in the case of a conical pointer, the pixel row capturing pixel data associated with the tip of the pointer, yields a small bounding area and an equally small model. Pixel rows capturing pixel data associated with the pointer body away from the pointer tip, yield larger bounding areas as the pointer broadens and therefore equally larger models. This change in model size allows the master controller 54 to determine the conical configuration of the pointer.

In the case of a pointer such as a finger that has a generally cylindrical shape, especially when the finger is pressed and flattened against the touch surface, the pixel rows capturing pixel data along the length of the finger, yield bounding areas and corresponding models that are basically the same size. This allows the master controller 54 to determine the cylindrical configuration of the pointer. As will be appreciated, by stacking the bounding areas or models generated for a series of pixel rows, a three-dimensional volumetric representation of the pointer can be constructed allowing the pointer type to be determined.

Once the master controller 54 has determined the pointer perimeter and the pointer orientation, the master controller 54 transmits the calculated pointer perimeter and orientation data, status and/or diagnostic information to the computer 56. In this manner, the pointer perimeter and orientation data transmitted to the computer 56 can be recorded as writing, drawing or erasing or can be used to control execution of application programs executed by the computer 56. The computer 56 also updates the display output conveyed to the projector 58 so that information presented on the touch surface 60 reflects the pointer activity. The master controller 54 also receives commands from the computer 56 and responds accordingly as well as generates and conveys command PIPs to the digital cameras $63_N$.

Figure 7:
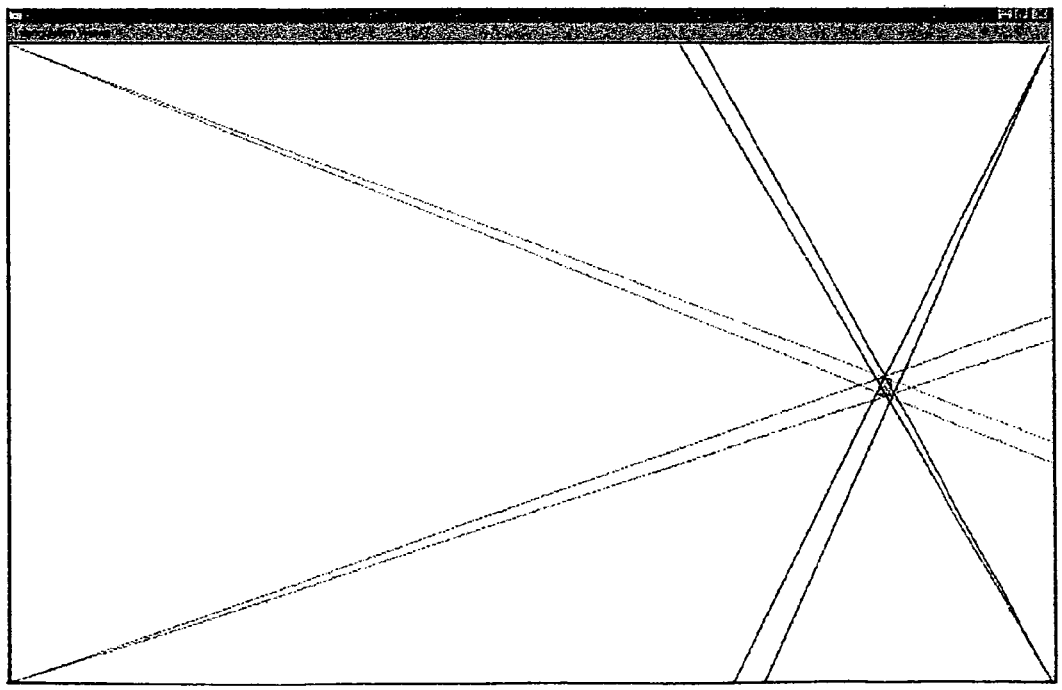
FIGS. 7 to 9 are graphical representations of overlapping triangulated pointer edges defining bounding areas generated in response to contacts on the touch surface using different type pointers, models in the form of shaded rectangular boxes being superimposed on the bounding areas.
Figure 8:
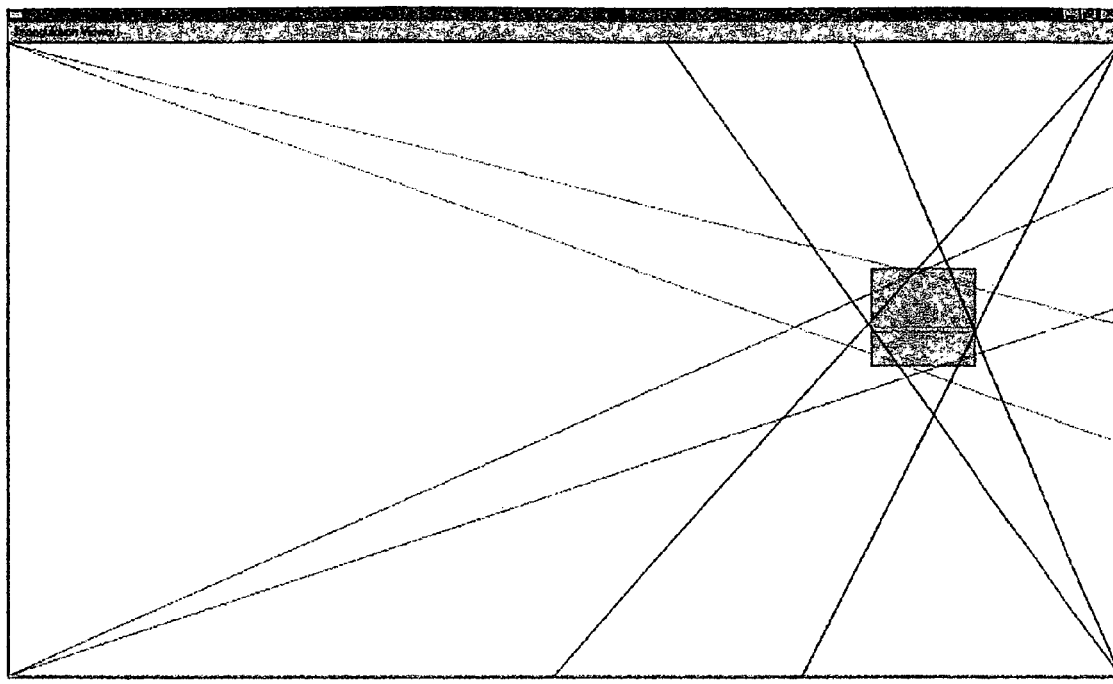
Figure 9:
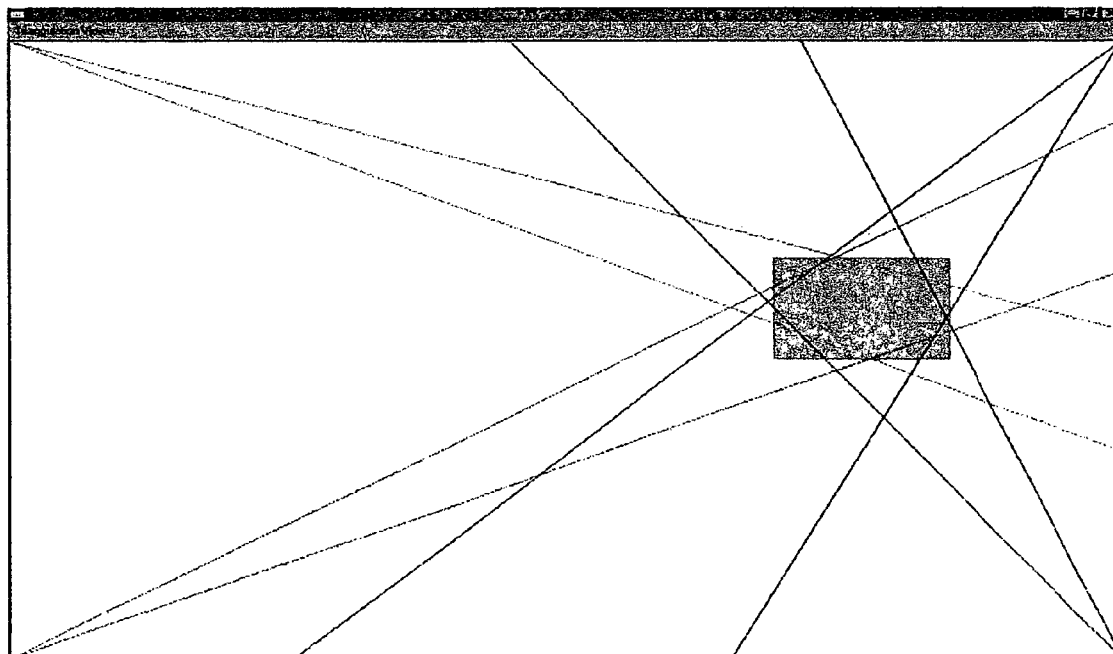

Turning now to FIGS. 7 to 9, graphical representations of overlapping triangulated edges defining bounding areas are shown. As can be seen, the bounding areas are not box-shaped but actually take the form of multi-sided polygons with the number of sides of the polygons ranging from four when using PIPs generated by a pair of cameras to eight when using PIPs generated by four cameras. In FIG. 7, the bounding area is generated as a result of a finger contacting the touch surface. In FIG. 8, the bounding area is generated as a result of a hockey puck contacting the touch surface. In FIG. 9, the bounding area is generated as a result of a rectangular eraser contacting the touch surface with the longest side of the eraser being in the horizontal orientation. As will be appreciated, this Figure clearly shows how pointer orientation can be used and in this case defines an erase tool perimeter of the correct size and orientation.

Figure 10:
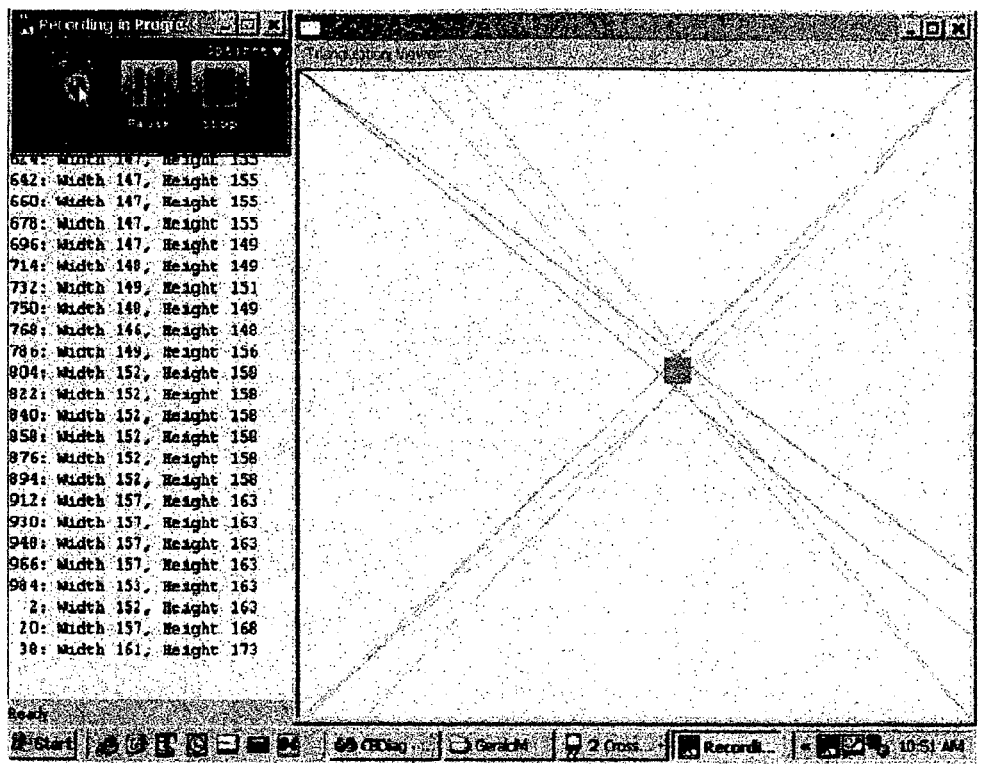
FIGS. 10 and 11 are screen shots generated by a diagnostic program showing the size, orientation and relative scale of different pointers contacting the touch surface.
Figure 11:
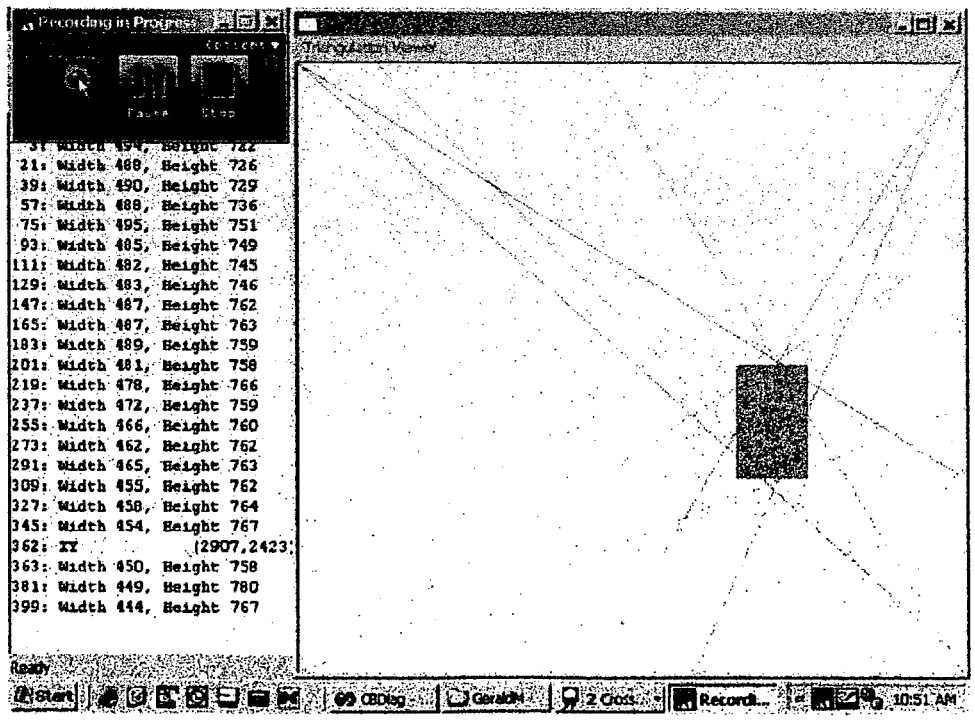

FIGS. 10 and 11 are screen shots generated by a diagnostic program showing the size, orientation and relative scale of different pointers contacting the touch surface. In particularly, FIG. 10 shows a small pointer of uniform width and height contacting the touch surface. The size of the pointer is 161×173 pixels. FIG. 11 shows a different pointer in contact with the touch surface. The size of the pointer in this case is 444×767 pixels.

Although a box-shaped rectangular model is shown superimposed over the bounding areas, those of skill in the art will appreciate that other model shapes may be used. Alternatively, the shapes of the bounding areas may be used to define the pointer perimeters. The center of the pointer can likewise be calculated by averaging the centers of the bounding areas. Also, although the master controller is shown as a separate processor, one of the camera processors may perform the master controller function and receive PIPs from the other camera processors.

As previously described in order to generate a three-dimensional volumetric representation of the pointer, the bounding area or model associated with each pixel row of the subarray is placed in a stack and the sizes of the bounding areas or models are compared. Of course only selected bounding areas or models need be examined. Also, if only pointer contact with the touch surface is of concern, triangulation need only be performed for the pixel row looking directly along the touch surface. In this manner, only the pointer perimeter at the touch surface contact point is defined.

Although preferred embodiments of the present invention have been described, those of skill in the art will appreciate that variations and modifications may be made without departing from the spirit and scope thereof as defined by the appended claims.

What is claimed is:

1. A touch system comprising:

at least two optical recording devices associated with a touch surface, said at least two optical recording devices acquiring images from different vantages and having overlapping fields of view, the at least two optical recording devices being accommodated by a frame at least partially bordering said touch surface; and processing structure processing image data acquired by said at least two optical recording devices to detect edges of a pointer in said images and to triangulate the detected edges to determine a bounding area that defines a pointer region.

2. A touch system according to claim 1 wherein said processing structure determines the center of the bounding area thereby to determine the center of said pointer.

3. A touch system according to claim 2 wherein said processing structure examines the shape of the bounding area to determine the orientation of said pointer relative to said touch surface.

4. A touch system according to claim 3 wherein said touch surface is generally rectangular and wherein an optical recording device is positioned adjacent each corner of said touch surface, said processing structure triangulating detected edges in images captured by multiple pairs of optical recording devices to yield multiple bounding areas, the smallest of said bounding areas being selected as the bounding area defining said pointer region.

5. A touch system according to claim 4 wherein said processing structure averages the centers of said multiple bounding areas to determine the center of said pointer.

6. A touch system according to claim 4 wherein said optical recording devices are digital cameras.

7. A touch system according to claim 6 wherein said digital cameras have selectable pixel arrays, pixel data from subsets of said pixel arrays being processed by said processing structure.

8. A touch system according to claim 7 wherein said processing structure comprises a camera processor associated with each digital camera, each camera processor processing pixel data to detect edges of said pointer.

9. A touch system according to claim 8 wherein said processing structure further comprises a master processor triangulating the detected edges to determine said multiple bounding areas and to select said smallest bounding area.

10. A touch system according to claim 9 wherein said master processor processes image data at a rate greater than the frame rates of said digital cameras.

11. A touch system according to claim 1 wherein said processing structure superimposes a model over said bounding area, said model having a size proportional to said bounding area and defining said pointer region.

12. A touch system according to claim 11 wherein said processing structure determines the center of said model thereby to determine the center of said pointer.

13. A touch system according to claim 12 wherein said model is generally rectangular and is centered over said bounding area.

14. A touch system according to claim 11 wherein the size of the model is examined to identify non-pointer input.

15. A touch system according to claim 14 wherein identified non-pointer input is ignored.

16. A touch system according to claim 1 wherein said optical recording devices are digital cameras having selectable pixel arrays, pixel data at least from pixel subsets of said pixel arrays being processed by said processing structure to determine said bounding area.

17. A touch system according to claim 16 wherein said processing structure examines the shape of said bounding area to determine the orientation of said pointer relative to said touch surface.

18. A touch system according to claim 1 wherein the optical recoding devices are positioned adjacent different corners of said touch surface.

19. A touch system according to claim 18 wherein the field of view of each optical recording device exceeds 90 degrees.

20. A touch system according to claim 1 wherein said touch surface is generally rectangular and wherein said frame surrounds said touch surface.

21. A touch system according to claim 20 wherein the optical recording devices are positioned adjacent different corners of said touch surface.

22. A touch system according to claim 21 wherein the field of view of each optical recording device exceeds 90 degrees.

23. A touch system according to claim 21 wherein said optical recording devices are digital cameras.

24. A touch system according to claim 23 wherein said digital cameras have selectable pixel arrays, pixel data from subsets of said pixel arrays being processed by said processing structure.

25. A touch system according to claim 21 wherein said processing structure processes image data at a rate greater than the frame rates of said optical recording devices.

26. A touch system comprising:
at least two optical recording devices associated with an input region, said at least two optical recording devices acquiring images from different vantages and having overlapping fields of view; and
processing structure processing image data acquired by said at least two optical recording devices to detect edges of a pointer in said images and to triangulate the detected edges to determine a bounding area that defines a pointer region, said processing structure processing the image data at a rate greater than the frame rates of said optical recording devices.

27. A touch system according to claim 26 wherein said optical recording devices are digital cameras.

28. A touch system according to claim 27 wherein said digital cameras have selectable pixel arrays, pixel data from subsets of said pixel arrays being processed by said processing structure.

29. A touch system according to claim 28 wherein said processing structure comprises a camera processor associated with each digital camera, each camera processor processing pixel data to detect edges of said pointer.

30. A touch system according to claim 26 wherein said processing structure determines the center of the bounding area thereby to determine the center of said pointer.

31. A touch system according to claim 27 wherein said processing structure examines the shape of the bounding area to determine the orientation of said pointer relative to said input region.

32. A touch system according to claim 26 wherein the optical recording devices are positioned adjacent different corners of said input region.

33. A touch system according to claim 32 where the field of view of each optical recording device exceeds 90 degrees.

34. A touch system comprising:
at least two digital cameras associated with a touch surface, said at least two digital cameras acquiring images from different vantages and having overlapping fields of view, each digital camera having a selectable pixel array; and
processing circuitry processing image data of pixel subsets of the pixel arrays of said at least two digital cameras to triangulate detected edges of a pointer in said images thereby to determine a boundary area representing a pointer region.

35. A touch system according to claim 34 wherein said processing circuitry further determines the center of the bounding area thereby to determine the center of said pointer.

36. A touch system according to claim 35 wherein said processing circuitry examines the shape of the bounding area to determine the orientation of said pointer relative to said touch surface.

37. A touch system according to claim 34 wherein said touch surface is generally rectangular and wherein a digital camera is positioned adjacent each corner of the touch surface, said processing circuitry triangulating detected edges of a pointer in images captured by multiple pairs of digital cameras to yield multiple bounding areas, the smallest bounding area being selected to represent said pointer region.

38. A touch system according to claim 37 wherein said processing structure averages the centers of said multiple bounding areas to determine the center of said pointer.

39. A touch system according to claim 37 wherein said processing structure superimposes a model over each of said bounding areas, the model superimposed on the smallest bounding area defining said pointer region.

40. A touch system according to claim 39 wherein the size of the model is examined to identify non-pointer input.

41. A touch system according to claim 40 wherein identified non-pointer input is ignored.

42. A touch system according to claim 41 wherein said processing circuitry processes image data at a rate greater than the frame rate of said digital cameras.

43. A touch system comprising:
at least two image sensors associated with a touch surface, said at least two image sensors acquiring images from different vantages and having overlapping fields of view; and
processing structure processing pixel data acquired by said at least two image sensors that is associated with regions of said pointer along its length to detect edges of the pointer in each region and triangulating the detected edges to yield a series of bounding areas, said series of bounding areas being stacked to generate a volumetric representation of said pointer.

44. A touch system according to claim 43 wherein said processing structure further determines the centroid of the volumetric representation of said pointer thereby to determine the centroid of said pointer.

45. A touch system according to claim 44 wherein said processing structure examines the volumetric representation to determine the orientation of said pointer relative to said touch surface.

46. A touch system according to claim 45 wherein said touch surface is generally rectangular and wherein the image sensors are positioned adjacent different corners of said touch surface.

47. A touch system according to claim 43 wherein said image sensors have selectable pixel arrays, pixel data from subsets of said pixel arrays being processed by said processing structure.

48. A touch system according to claim 47 wherein said processing structure processes data at a rate greater than the frame rates of said image sensors.

* * * * *

UNITED STATES PATENT AND TRADEMARK OFFICE
CERTIFICATE OF CORRECTION

PATENT NO.        : 7,619,617 B2                                Page 1 of 1
APPLICATION NO.   : 11/236622
DATED             : November 17, 2009
INVENTOR(S)       : Morrison et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 669 days.

Signed and Sealed this

Twenty-sixth Day of October, 2010

David J. Kappos
*Director of the United States Patent and Trademark Office*